G. A. Carman,
Seed Sower.

No. 111,726.   Patented Feb. 14, 1871.

Witnesses.            Inventor.
Wm Haskell King      Geo. A. Carman
Oliver Drake              Oliver Drake Atty

United States Patent Office

GEORGE A. CARMAN, OF DEER PARK, NEW YORK.

Letters Patent No. 111,726, dated February 14, 1871.

IMPROVEMENT IN SEED-SOWERS.

The Schedule referred to in these Letters Patent and making part of the same.

I, GEORGE A. CARMAN, of Deer Park, Long Island, State of New York, have invented certain Improvements in Seed-sowing Machines, of which the following, in connection with the accompanying drawing, is a specification.

The bottom of the hopper B is provided with a metallic plate, $a$, which is fitted over the top of the wheel C in such a manner that seed cannot escape at the sides or ends.

Figure 1:
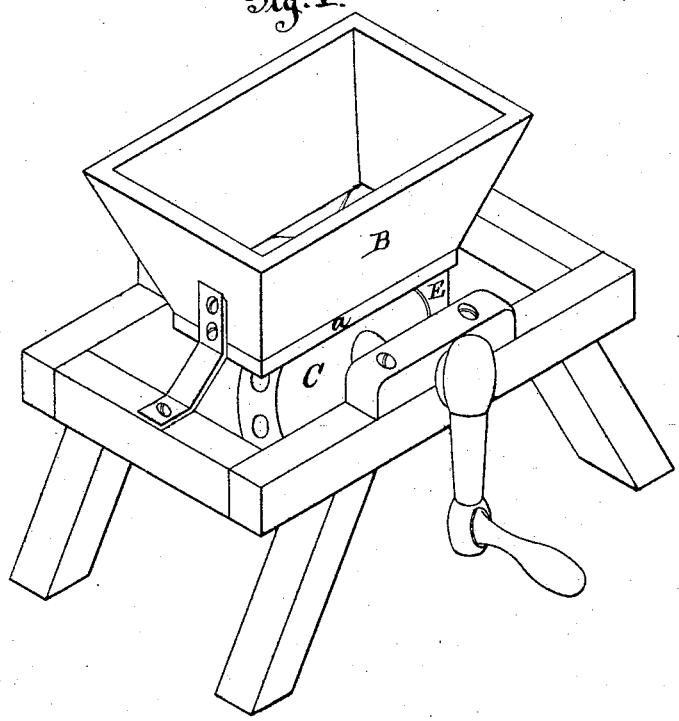
Figure 2:
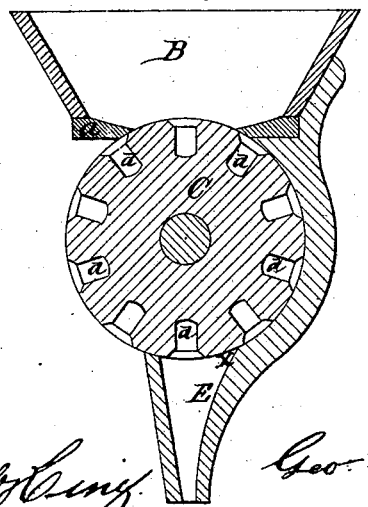

Part of the periphery of the wheel C projects up through the metallic plate $a$, as shown in Figure 2, and the said periphery is beveled on both edges, so as to afford a ready and easy passage through the seed in the hopper.

A series of openings, $d$ $d$, is made in the periphery of this wheel, and said openings are at equal distances apart and of about half an inch in diameter, and are supplied with set-screws, the openings to receive the seed and the set-screws to regulate the quantity, which is effected by simply setting the screws in or out, as the case may be.

The tube or pipe E through which the seed passes is formed with the semi-cylindrical portion F, which portion embraces about one-half of the wheel C, as clearly shown in fig. 2.

When the machine is in use, the wheel C revolves through the metal plate in the bottom of the hopper B, which hopper contains the seed, and the holes or openings $d$ $d$ are filled, and the seed is carried around to the point indicated by $x$ in fig. 2, when it is discharged into the pipe E, and from thence into the furrow.

I am aware that it is not new to inclose a cylinder provided with a series of adjustable screws within a case; such I do not broadly claim, but Having described my invention,

What I claim is—

The metal plate $a$, hopper B, wheel C, with its openings $d$ $d$ and set-screws, arranged and operating in connection with the pipe E, formed with the semi-cylindrical portion F, which surrounds the periphery of the wheel C in one piece, as and for the purpose set forth.

GEORGE A. CARMAN.

Witnesses:
N. S. MEAD,
JAMES BALDWIN.